(12) United States Patent
Yoldemir et al.

(10) Patent No.: US 11,537,905 B2
(45) Date of Patent: *Dec. 27, 2022

(54) INFERENCE-BASED ASSIGNMENT OF DATA TYPE TO DATA

(71) Applicant: SAP SE, Walldorf (DE)

(72) Inventors: Burak Yoldemir, Vancouver (CA); Alex MacAulay, Vancouver (CA)

(73) Assignee: SAP SE, Walldorf (DE)

( * ) Notice: Subject to any disclaimer, the term of this patent is extended or adjusted under 35 U.S.C. 154(b) by 799 days.

This patent is subject to a terminal disclaimer.

(21) Appl. No.: 16/443,581

(22) Filed: Jun. 17, 2019

(65) Prior Publication Data

US 2019/0303775 A1  Oct. 3, 2019

Related U.S. Application Data

(63) Continuation of application No. 15/186,066, filed on Jun. 17, 2016, now Pat. No. 10,366,333.

(51) Int. Cl.
*G06N 5/04* (2006.01)
*G06N 20/00* (2019.01)
*G06F 16/2457* (2019.01)

(52) U.S. Cl.
CPC ......... *G06N 5/04* (2013.01); *G06F 16/24578* (2019.01); *G06N 20/00* (2019.01)

(58) Field of Classification Search
CPC ..... G06N 5/04; G06N 20/00; G06F 16/24578
USPC ........................................................ 706/12
See application file for complete search history.

(56) References Cited

U.S. PATENT DOCUMENTS

2015/0235143 A1\* 8/2015 Eder ...................... G16H 50/50
706/12

OTHER PUBLICATIONS

Moschitti et al ("Open Domain Information Extraction via Automatic Semantic Labeling") (Year: 2003).\*
Lee et al ("Visualization and Analysis of Clickstream Data of Online Stores for Understanding Web Merchandising") (Year: 2001).\*
Park et al ("Application of semi-automatic metadata generation in libraries: Types, tools, and techniques") (Year: 2009).\*

(Continued)

*Primary Examiner* — Lut Wong
(74) *Attorney, Agent, or Firm* — Fountainhead Law Group P.C.

(57) ABSTRACT

Embodiments associate a relevant semantic data type (e.g., date) with incoming raw data (e.g., a column of digits) which lacks metadata. Assignment of semantic data type is inferred from a plurality of features. A first step determines a first feature comprising success rate in converting the raw data into various semantic data types. Then, alignment between observed/reference distributions of other features (e.g., data first digit, data length) is determined per-semantic data type. Total scores for each semantic data type are calculated from the combined features, and used as a basis for ranking the semantic data types. The total scores may reflect a weighting of the various features. In a second step, top-ranked semantic data types may be further differentiated from one another by applying additional features. User feedback regarding accuracy of semantic data type assignment, may be incorporated into training data used to modify the feature reference distributions.

20 Claims, 14 Drawing Sheets

(56) References Cited

OTHER PUBLICATIONS

Moschitti et al. "Open Domain Information Extraction Via Automatic Semantic Labeling", American Association for Artificial Intelligence, 5 pages, 2003.

Lee et al. "Visualizaiton and Analysis of Clickstream Data of Online Stores for Understanding Web Merchandising", Data Mining and Knowledge Discovery, vol. 5, pp. 59-84, 2001.

Park et al "Application of Semi-Automatic Metadata Generation in Libraries: Types, Tools and Techniques", Library and Information Science Research, Jul. 21, 2009, 8 pages.

* cited by examiner

| Semantic Data Type | 0 | 1 | 2 | 3 | 4 | 5 | 6 | 7 | 8 | 9 |
|---|---|---|---|---|---|---|---|---|---|---|
| Integer | 0.009 | 0.3 | 0.175 | 0.124 | 0.096 | 0.078 | 0.066 | 0.057 | 0.05 | 0.045 |
| Date (YYYYMMDD) | 0 | 0.25 | 0.75 | 0 | 0 | 0 | 0 | 0 | 0 | 0 |
| Year (YYYY) | 0 | 0.25 | 0.75 | 0 | 0 | 0 | 0 | 0 | 0 | 0 |
| Month (w/o leading zero) | 0 | 0.3336 | 0.0833 | 0.0833 | 0.0833 | 0.0833 | 0.0833 | 0.0833 | 0.0833 | 0.0833 |
| Month (w/ leading zero) | 0.75 | 0.25 | 0 | 0 | 0 | 0 | 0 | 0 | 0 | 0 |
| Day (w/o leading zero) | 0 | 0.37 | 0.37 | 0.08 | 0.03 | 0.03 | 0.03 | 0.03 | 0.03 | 0.03 |
| Day (w/ leading zero) | 0.29 | 0.322 | 0.322 | 0.064 | 0 | 0 | 0 | 0 | 0 | 0 |
| ID | 0.08 | 0.24 | 0.12 | 0.08 | 0.08 | 0.08 | 0.08 | 0.08 | 0.08 | 0.08 |
| Boolean | 0.5 | 0.5 | 0 | 0 | 0 | 0 | 0 | 0 | 0 | 0 |
| Quarter | 0 | 0.25 | 0.25 | 0.25 | 0.25 | 0 | 0 | 0 | 0 | 0 |
| IP Address (v-4) | 0 | 0.4317 | 0.2628 | 0.0436 | 0.0436 | 0.0436 | 0.0436 | 0.0436 | 0.0436 | 0.0436 |

FIG. 9

FIG. 10
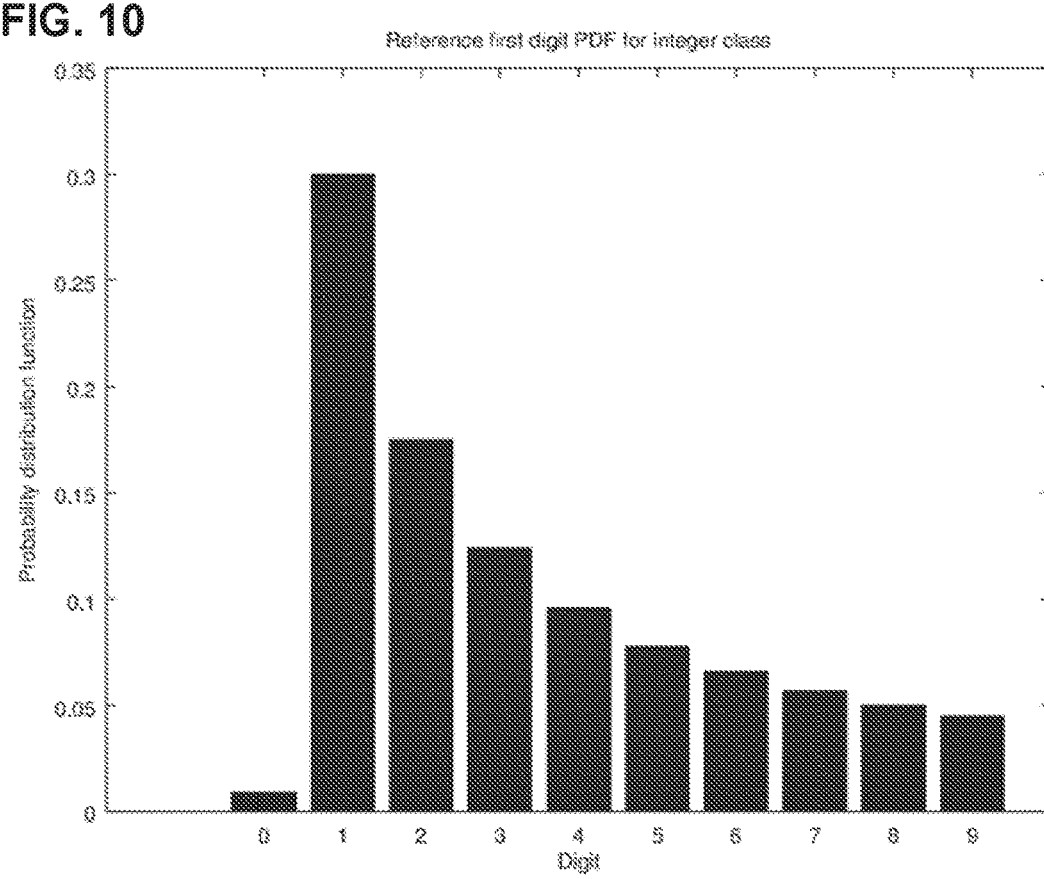
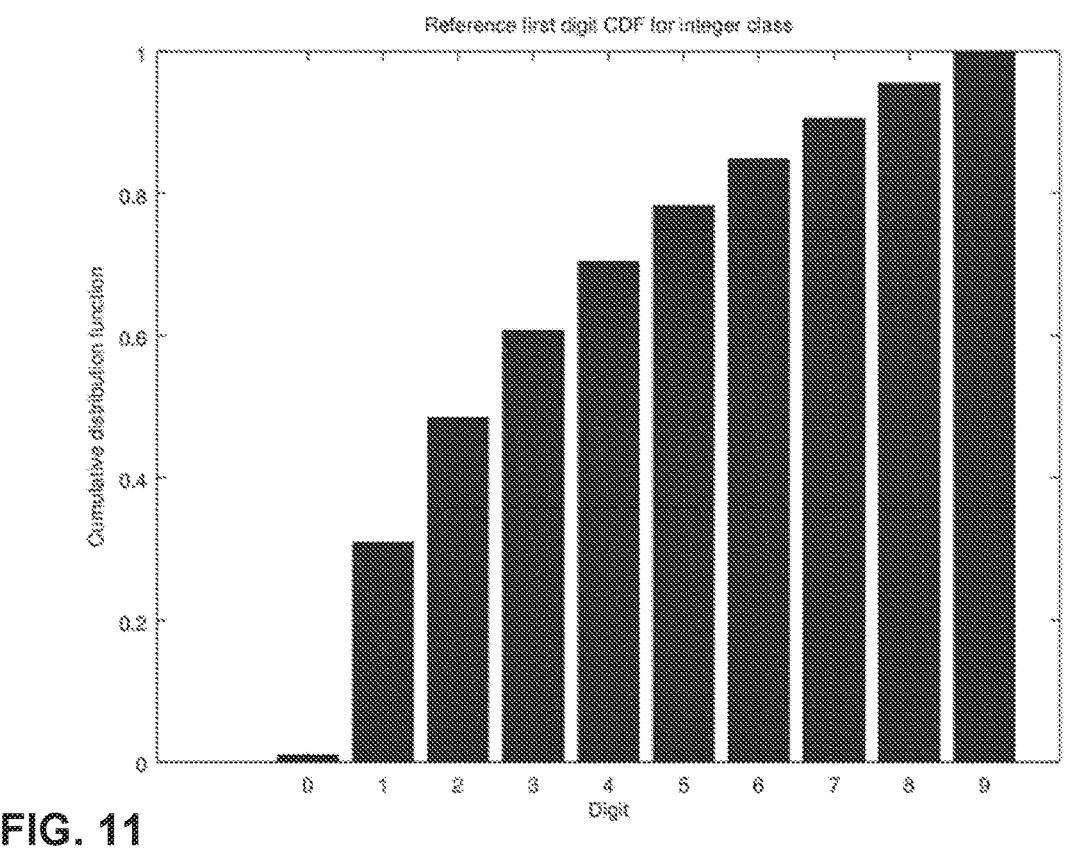
FIG. 11

| Semantic Data Type | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Integer* | 0 | 3E-4 | 0.108 | 0.798 | 0.108 | 3E-4 | 0 | 0 | 0 | 0 | 0 | 0 | 0 | 0 | 0 |
| Date (YYYYM MDD) | 0 | 0 | 0 | 0 | 0 | 0 | 0 | 1 | 0 | 0 | 0 | 0 | 0 | 0 | 0 |
| Year (YYYY) | 0 | 0 | 0 | 1 | 0 | 0 | 0 | 0 | 0 | 0 | 0 | 0 | 0 | 0 | 0 |
| Month (w/o leading zero) | 0.75 | 0.25 | 0 | 0 | 0 | 0 | 0 | 0 | 0 | 0 | 0 | 0 | 0 | 0 | 0 |
| Month (w/ leading zero) | 0 | 1 | 0 | 0 | 0 | 0 | 0 | 0 | 0 | 0 | 0 | 0 | 0 | 0 | 0 |
| Day (w/o leading zero) | 0.3 | 0.7 | 0 | 0 | 0 | 0 | 0 | 0 | 0 | 0 | 0 | 0 | 0 | 0 | 0 |
| Day (w/ leading zero) | 0 | 1 | 0 | 0 | 0 | 0 | 0 | 0 | 0 | 0 | 0 | 0 | 0 | 0 | 0 |
| ID** | 0 | 0 | 0 | 1 | 0 | 0 | 0 | 0 | 0 | 0 | 0 | 0 | 0 | 0 | 0 |
| Boolean | 1 | 0 | 0 | 0 | 0 | 0 | 0 | 0 | 0 | 0 | 0 | 0 | 0 | 0 | 0 |
| Quarter | 1 | 0 | 0 | 0 | 0 | 0 | 0 | 0 | 0 | 0 | 0 | 0 | 0 | 0 | 0 |
| IP Address | 0 | 0 | 0 | 0 | 0 | 0 | 0 | 4.77E-5 | 0.0015 | 0.0102 | 0.088 | 0.166 | 0.314 | 0.32 | 0.134 |

FIG. 16

FIG. 17
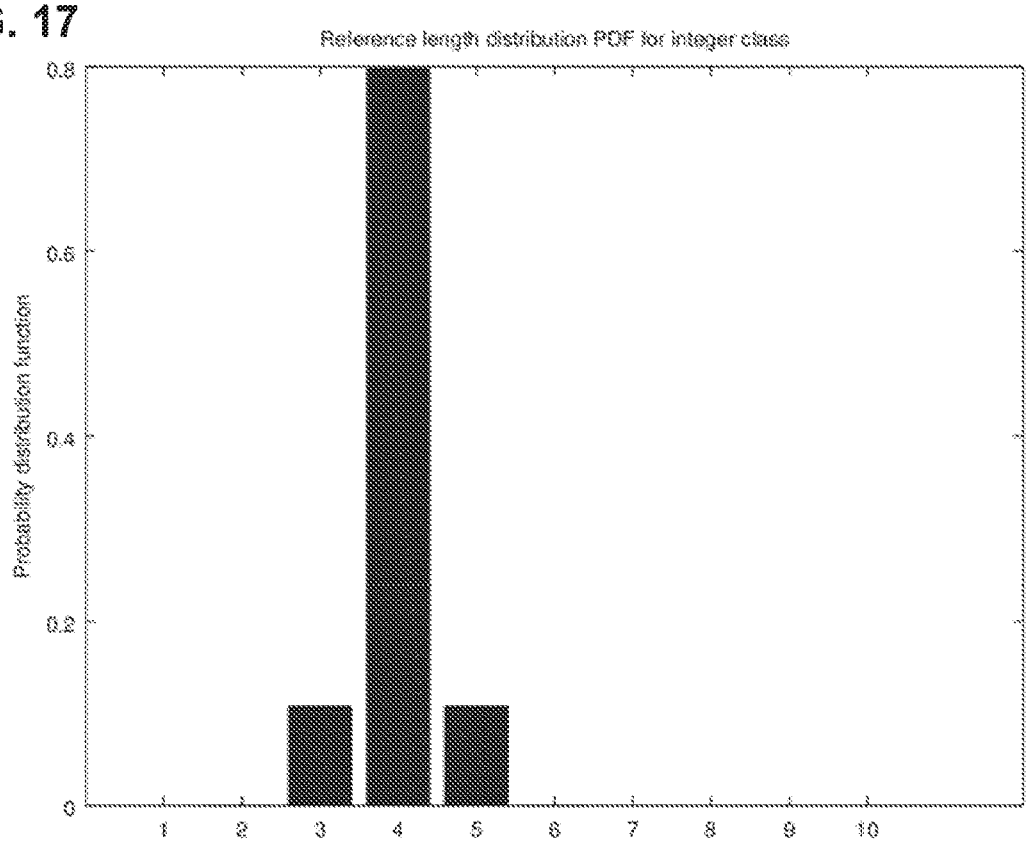
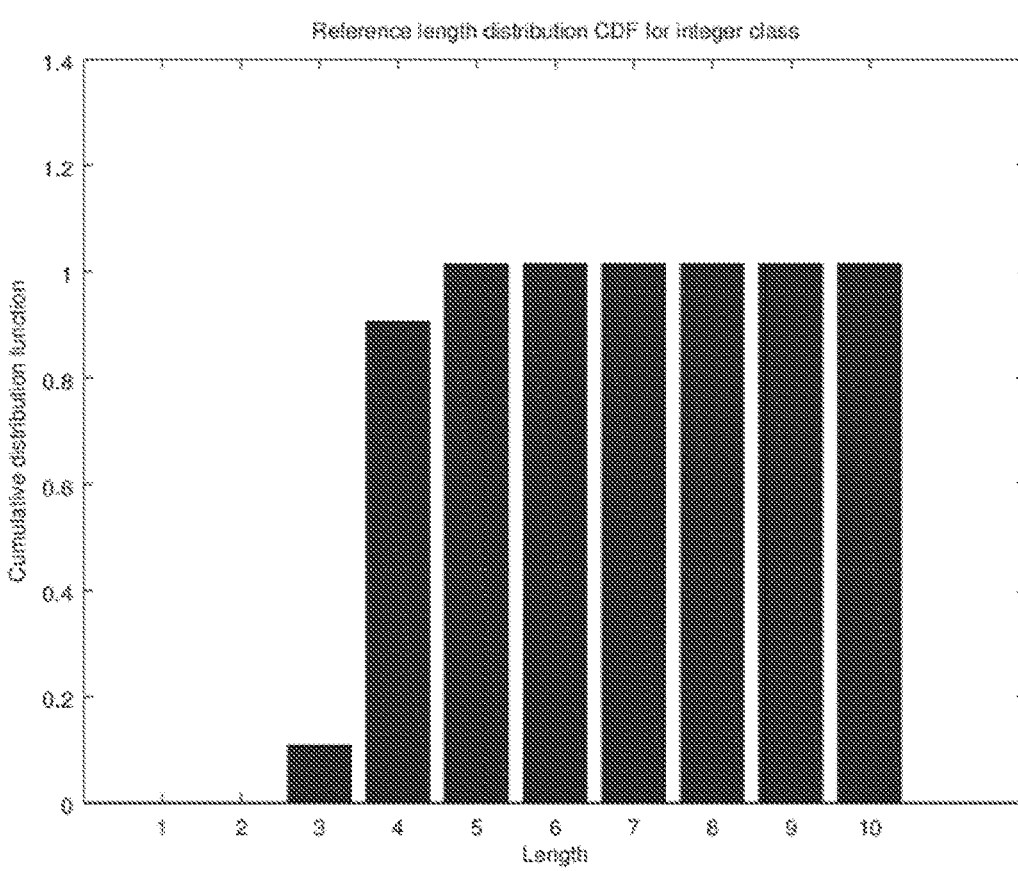
FIG. 18

INFERENCE-BASED ASSIGNMENT OF DATA TYPE TO DATA

BACKGROUND

Unless otherwise indicated herein, the approaches described in this section are not prior art to the claims in this application and are not admitted to be prior art by inclusion in this section.

Embodiments relate to data handling for analysis purposes, and in particular, to methods and apparatuses automatically enriching a data set with data type via an inference. Specific embodiments automatically assign a data type to data stored in a database, utilizing one or more inferences applied alone or in combination.

Databases and overlying applications referencing data stored therein, offer a powerful way of analyzing large volumes of data that are related in various ways. In particular, discrete values of stored data may be organized into larger data structures comprising related fields.

Such larger data structures may also be referred to as data objects, and may be represented in the form of tables having rows and columns. Through the skillful and intuitive presentation of such data structures in the form of tables and charts, a user can describe complex issues and the factual/forecast data underlying those issues.

A data type represents data corresponding to a common category. For example, in a data structure comprising a United States address, a data type may comprise the zip code field comprising five (or nine) digits.

In certain cases raw data received for handling by an information storage system may not include any indication of data type. For analytical purposes, however, it can be desirable to classify that raw data as a particular data type in order to facilitate its inclusion within larger data structures.

Such enrichment of a data set with data type may be valuable to inform the user regarding the nature of additional data values expected to be received. Furthermore, enriching data sets with data types can allow deduction of operations to be applied on different portions of the data. For example, an aggregation operation performed on a "zip code" field of a "U.S. Address" data object, would be expected to return groupings of data useful in geographic analysis.

Data types can be manually assigned by a user. Such manual approaches, however, may be time-consuming, as they require user insight to recognize complex/subtle relationships between data fields, and then to implement those relationships in abstract underlying data structures.

SUMMARY

Embodiments associate a relevant semantic data type (e.g., date) with incoming raw data (e.g., a column of digits) lacking metadata. Assignment of semantic data type is inferred from a plurality of features. A first step determines a first feature comprising success rate in converting the raw data into various semantic data types. Then, alignment between observed/reference distributions of other features (e.g., data first digit, data length) is determined per-semantic data type. Total scores for each semantic data type are calculated from the combined features, and used as a basis for ranking the semantic data types. The total scores may reflect a weighting of the various features. In a second step, top-ranked semantic data types may be further differentiated from one another by applying additional features. User feedback regarding accuracy of semantic data type assignment, may be incorporated into training data used to modify the feature reference distributions.

An embodiment of a computer-implemented method comprises receiving a plurality of data points lacking associated metadata, and determining a first score of a first feature comprising a success rate converting the plurality of data points to a semantic data type. A second score is determined from alignment between an observed distribution of a second feature in the plurality of data points, and a reference distribution of the second feature in the semantic data type. A third score is determined from alignment between an observed distribution of a third feature in the plurality of data points, and a reference distribution of the third feature in the semantic data type. A total score for the semantic data type is calculated from the first, second, and third scores. An initial ranking of the total score is determined in comparison with another total score reflecting the first, second, and third features in another semantic data type. A fourth feature is identified that differentiates between the semantic data type and the other semantic data type. A final ranking is assigned to the total score and the other total score by determining alignment between an observed distribution of the fourth feature in the plurality of data points, and reference distributions of the fourth feature in the semantic data type and in the other semantic data type. The semantic data type is assigned to the plurality of data points based upon the final ranking, and the plurality of data points are stored with metadata indicating the semantic data type.

A non-transitory computer readable storage medium embodies a computer program for performing a method comprising receiving a plurality of data points lacking associated metadata, and determining a first score of a first feature comprising a success rate converting the plurality of data points to a semantic data type. A second score is determined from alignment between an observed distribution of a second feature in the plurality of data points, and a reference distribution of the second feature in the semantic data type, the alignment comprising a Kolmogorov-Smirnov distance. A third score is determined from alignment between an observed distribution of a third feature in the plurality of data points, and a reference distribution of the third feature in the semantic data type. A total score for the semantic data type is calculated from the first, second, and third scores. An initial ranking of the total score is determined in comparison with another total score reflecting the first, second, and third features in another semantic data type. A fourth feature is identified differentiating between the semantic data type and the other semantic data type. A final ranking is assigned to the total score and the other total score by determining alignment between an observed distribution of the fourth feature in the plurality of data points and reference distributions of the fourth feature in the semantic data type and in the other semantic data type. The semantic data type is assigned to the plurality of data points based upon the final ranking, and the plurality of data points are stored with metadata indicating the semantic data type.

An embodiment of a computer system comprises one or more processors and a software program executable on said computer system. The software program is configured to cause an in-memory database engine to receive a plurality of data points lacking associated metadata, and to determine a first score of a first feature comprising a success rate converting the plurality of data points to a semantic data type. The software program is further configured to cause the in-memory database engine to determine a second score from alignment between an observed distribution of a second feature in the plurality of data points, and a reference distribution of the second feature in the semantic data type. The in-memory database engine determines a third score from alignment between an observed distribution of a third feature in the plurality of data points, and a reference distribution of the third feature in the semantic data type. A total score for the semantic data type is calculated from the first, second, and third scores. An initial ranking of the total score is determined in comparison with another total score reflecting the first, second, and third features in another semantic data type. A fourth feature is identified differentiating between the semantic data type and the other semantic data type. A final ranking is assigned to the total score and the other total score by determining alignment between an observed distribution of the fourth feature in the plurality of data points, and reference distributions of the fourth feature in the semantic data type and in the other semantic data type. The semantic data type is assigned to the plurality of data points based upon the final ranking, and the plurality of data points are stored in a column of a table of an in-memory database with metadata indicating the semantic data type.

In certain embodiments the alignment between the observed distribution of the second feature and the reference distribution of the second feature is reflected by a Kolmogorov-Smirnov distance.

In some embodiments the second feature comprises a data point length.

In certain embodiments the second feature comprises a data point first digit.

According to particular embodiments the fourth feature comprises a number of digits behind a decimal point.

In various embodiments the fourth feature comprises a data point digit other than a first digit.

A particular embodiment may further comprise deriving the reference distribution of the second feature from training data, receiving feedback regarding accuracy of the assignment of semantic data type, and updating the training data to reflect the feedback.

A specific embodiment may further comprise receiving feedback regarding accuracy of the assignment of semantic data type, calculating the total score by assigning respective weight coefficients to the first, second, and third scores, and updating the respective weight coefficients based upon the feedback.

In certain embodiments converting the plurality of data points to the semantic data type employs a pattern matching mechanism comprising regular expressions specifying class-specific search patterns.

The following detailed description and accompanying drawings provide a better understanding of the nature and advantages of embodiments.

BRIEF DESCRIPTION OF THE DRAWINGS

FIGS. 7-20 provide information utilized in one example of a first step of a data type enrichment procedure according to an embodiment.

DETAILED DESCRIPTION

Described herein are methods and apparatuses that perform inference-based enrichment of data sets with data types. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments associate a relevant semantic data type (e.g., date) with incoming raw data (e.g., a column of digits) which lacks metadata. Assignment of semantic data type is inferred from a plurality of features. A first step determines a first feature comprising success rate in converting the raw data into various semantic data types. Then, alignment between observed/reference distributions of other features (e.g., data first digit, data length) is determined per-semantic data type. Total scores for each semantic data type are calculated from the combined features, and used as a basis for ranking the semantic data types. The total scores may reflect a weighting of the various features. In a second step, top-ranked semantic data types may be further differentiated from one another by applying additional features. User feedback regarding accuracy of semantic data type assignment, may be incorporated into training data used to modify the feature reference distributions.

Figure 1:
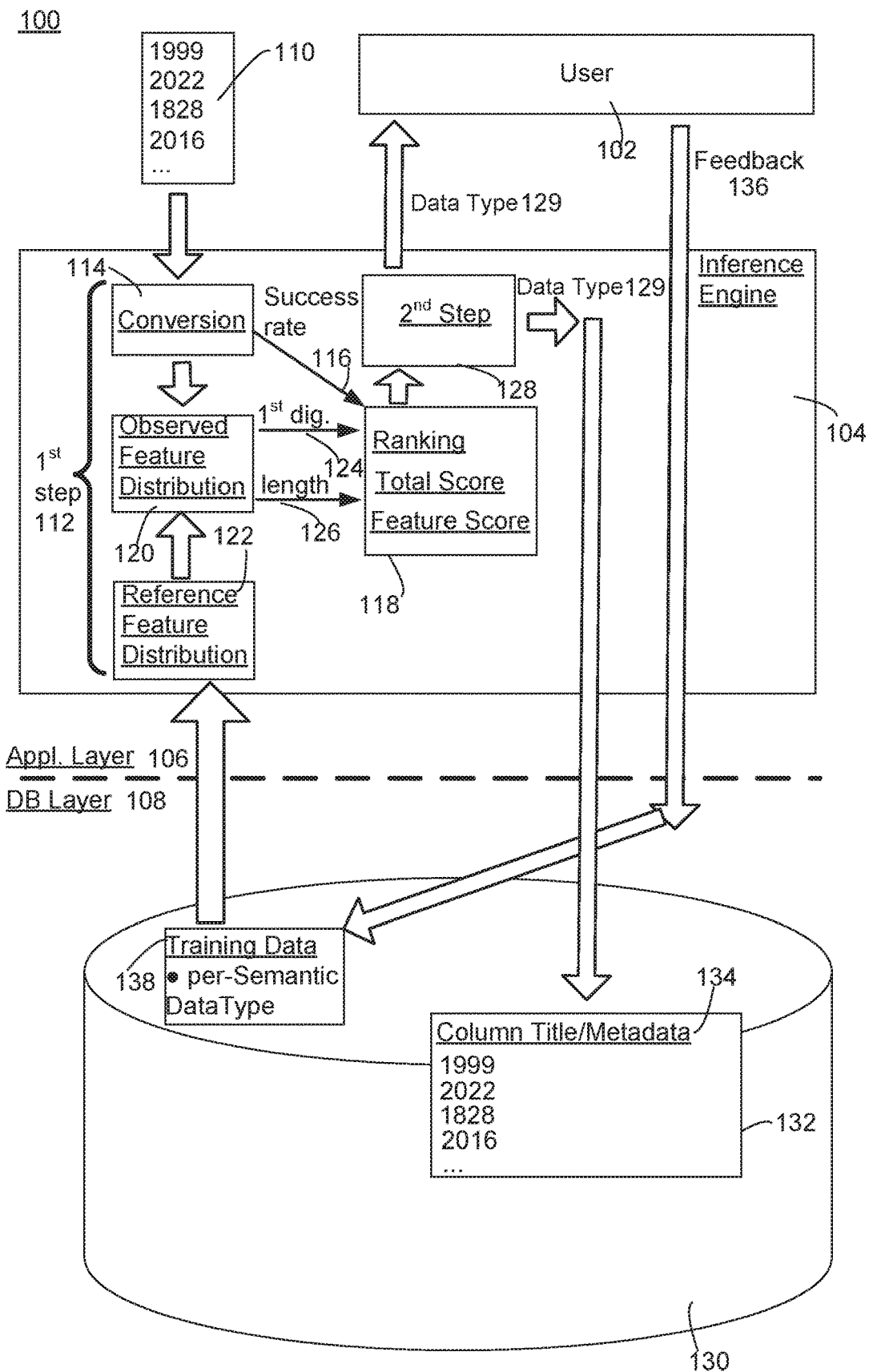
FIG. 1 shows a simplified diagram of a system according to an embodiment.

FIG. 1 presents a simplified view of a system 100 according to an embodiment. In particular, user 102 is in communication with an inference engine 104 present in an application layer 106 overlying a database layer 108.

The inference engine is configured to receive a raw data set 110 as an input. That raw data comprises values lacking any associated metadata to inform the nature of the data. Thus the inference engine seeks to assign a data type metadata to the input raw data set.

Here, for purposes of illustration the raw data set is shown as a list of four-digit numbers. However, the data set could take any form, including strings and symbols of different types.

A first step 112 of assigning data type, comprises a first feature 114 of converting the raw data into a known, target semantic data type. This may be done through a pattern matching mechanism, such as regular expressions which specify class-specific search patterns.

For example one recognized target semantic data type could be a city name. Here, attempted conversion of the four digit numerals of the raw data into a city name would not be successful, as the raw input data comprises exclusively numbers rather than letters. By contrast, attempted conversion of the four digit numerals of the raw data into a year, would be largely successful, given the four digit correspondence to year in the western calendar.

The success in converting raw data into a known target data type, is quantified in terms of a success rate. That rate is the fraction of the non-empty raw data received in a column, that can successfully be converted into a target semantic data type.

A large number of possible target data types are known (e.g., zip code, IP address, identifier, etc.) Thus, a per-data type success rate 116 can be calculated for each, and stored in location 118 by the inference engine.

The first step of assigning data type, further comprises comparing observed distributions 120 of features of the raw data, with reference distributions 122 of those features. For example, a first observed feature may comprise the identity of a first digit in the raw data. The distribution of first digits observed in the raw data, may be compared with a reference distribution of first digits for a particular semantic data type, in order to infer the data type.

Here, a high incidence of the first digit "1" or "2" in the raw data, correlates with an expected reference distribution for western calendar years. This per-semantic data type correlation between observed and reference distribution for the first digit feature, is reflected in a score 124 that is stored by the inference engine. As further discussed in detail below, in particular embodiments a degree of correlation between observed and reference distributions may be quantified in terms of a Kolmogorov-Smirnov (KS) distance.

A second feature observed in the raw data may be a length (i.e., a number of digits). The distribution of length observed in the raw data, may be compared with a reference distribution of length for a particular semantic data type, in order to infer the data type.

Here, a universal incidence of a length of "4" in the raw data, again correlates with an expected reference distribution for western calendar years. As discussed below, this per-semantic data type correlation between observed and reference distribution for the length feature, is reflected in a score 126 that is stored by the inference engine.

Based upon the scores for the success rate feature, the first digit feature, and the length feature, the inference engine generates a total score. This total score reflects how well the raw data corresponds to a particular known target semantic data type.

A total score is calculated for each target semantic data type. Then, at the conclusion of the first step, a ranking of the possible assigned semantic data types is calculated.

It is noted that certain semantic data types may be readily differentiated by comparing observed/reference distributions for further specific features. Accordingly, the inference engine is configured to perform a second step 128, in which top-ranked semantic data types are evaluated based upon additional feature distributions.

For example both the "identifier" semantic data type and the "currency" semantic data type may be characterized by a same number of digits that include a decimal point. Accordingly, where those semantic data types are top-ranked, a second step may compare observed and expected distributions for different feature(s) that effectively differentiates between them.

One such feature could be the distribution of a number of digits lying to the right of the decimal point. An observed distribution clustered with only two digits to the right of a decimal point, could reveal the currency (rather than identifier) semantic data type. Other examples of data types amenable to differentiation based on specific feature(s), and details regarding such a second step, are presented later below in the examples.

At the conclusion of the second step, the data type 129 assigned is communicated by the engine to both the user and to the underlying database 130. There it is added as metadata to a column title 134 of a table 132 storing the raw data, reflecting the data type assigned.

It is further noted that a user can disagree with the data type assigned. The user may then provide feedback 136 to correct/update the training data 138 stored in the underlying data layer. This feedback may be in the form of correcting the data type that has been inferred.

That training data was originally utilized in creating the reference feature distributions for the various semantic data types. Accordingly, the user feedback may be incorporated into the training data to enhance the accuracy of the per-semantic data type feature score ultimately responsible for the assignment.

Figure 2:
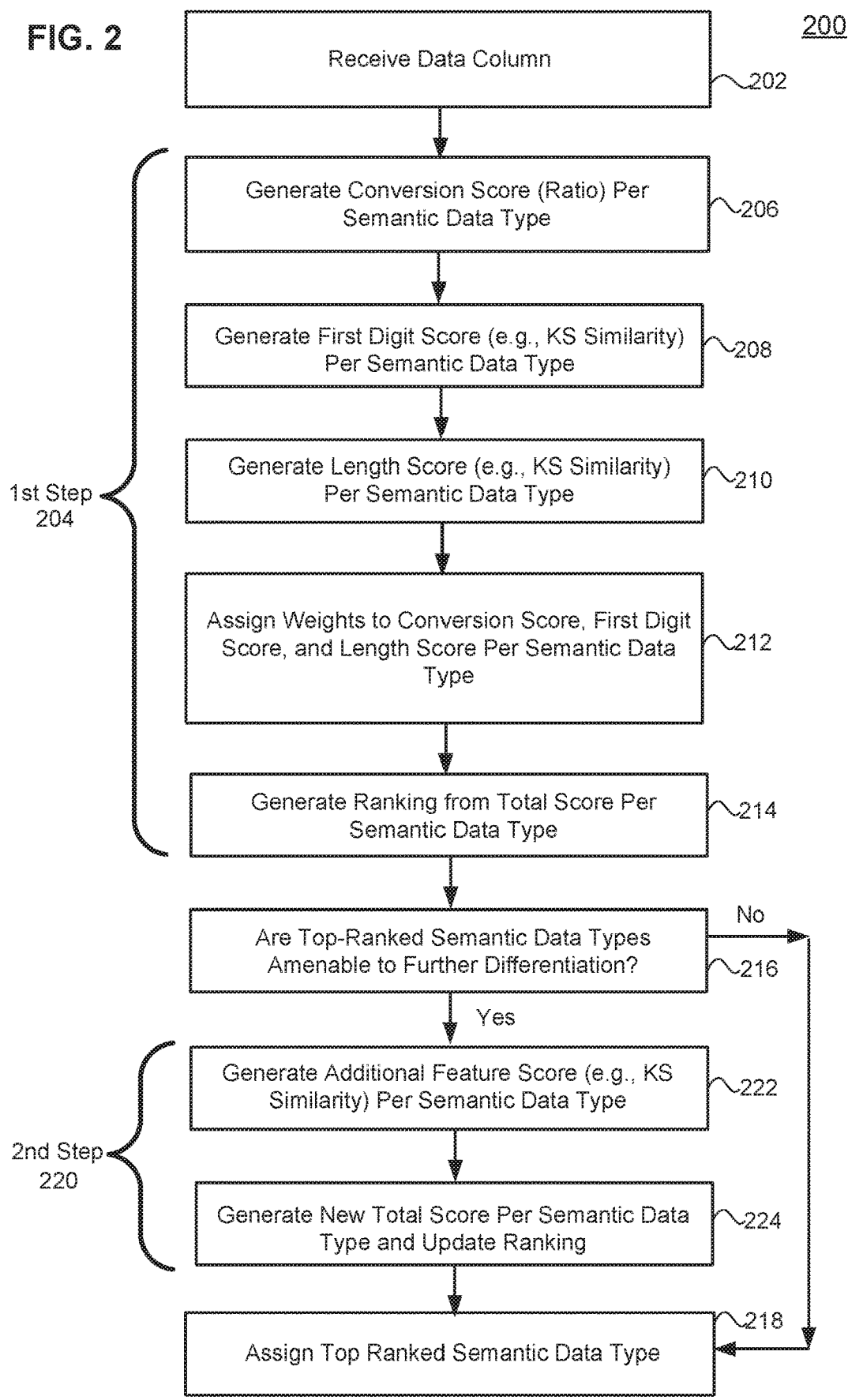
FIG. 2 shows a simplified flow diagram of a method according to an embodiment.

FIG. 2 is a simplified flow diagram showing a method 200 according to an embodiment. At 202, an input data column is received lacking any associated metadata.

A first step 204 in then conducted. At 206, a conversion score (e.g., expressed as a success rate) is generated per-semantic data type. At 208, a first digit score (e.g., expressed as a KS distance) is generated per-semantic data type. As is explained in detail below, this first digit score may be expressed in terms of a Kolmogorov-Smirnov (KS) similarity between observed/reference cumulative distribution functions.

At 210, a length score is generated per-semantic data type. Again, that score may be expressed in terms of a KS similarity.

At 212 weights are assigned to the conversion score, first digit score, and length score to create a total score per-semantic data type. At 214, a ranking of semantic data types is generated from the total scores.

At 216, it is determined whether top ranked semantic data types meet a condition. This condition may comprise the top ranked data types being amenable to further differentiation based upon the application of one or more additional specific features.

If the condition is not met, at 218 the top ranked semantic data type is assigned to the data. If the condition is met, the method proceeds to the second step 220.

Specifically, at 222 an additional feature score (e.g., expressed in terms of KS similarity) is generated for the top ranked semantic data types. At 224, a new score is generated per semantic data type, and the ranking is updated. At 218, the top ranked semantic data type is assigned to the data column.

Further details regarding the inference of semantic data type according to various embodiments, are now described.

As mentioned above, embodiments may employ a two-step procedure in order to perform data type inference. In first step, certain embodiments may apply three features in sequence in order to classify the received data in a given column.

A first feature of the first step, is conversion success rate. This first feature refers to the fraction of the non-empty raw data received in the column, that can successfully be converted into a target semantic data type.

Target semantic data types have a reference distribution function which can be compared to an observed distribution. Such reference distributions are available for a large number of possible semantic data types. Examples can include but are not limited to:

Integers
Date (YYYYMMDD)
Year (YYYY)
Month (1 to 12)
Day
ID
Boolean (0 or 1)
Quarter (1 to 4)
IP address
Currency transaction (e.g., magnitude not related to surrounding values)
Currency balance (e.g., magnitude related to surrounding values)

Geographic location (latitude-longitude tuple).

This first feature (conversion of raw data to data type) is primarily performed through pattern matching. An example of such a pattern matching mechanism comprises regular expressions specifying class-specific search patterns. Conversion success is defined as the fraction of the data values in a column that can be converted successfully to a target semantic data type.

A second feature of data type enrichment, is matching a distribution of first digits in the converted data, with a distribution of first digits expected in a comprehensive reference sample. This second feature quantifies fitness of matching of converted observed values with expected distributions, in terms of their first digits.

Figure 3:
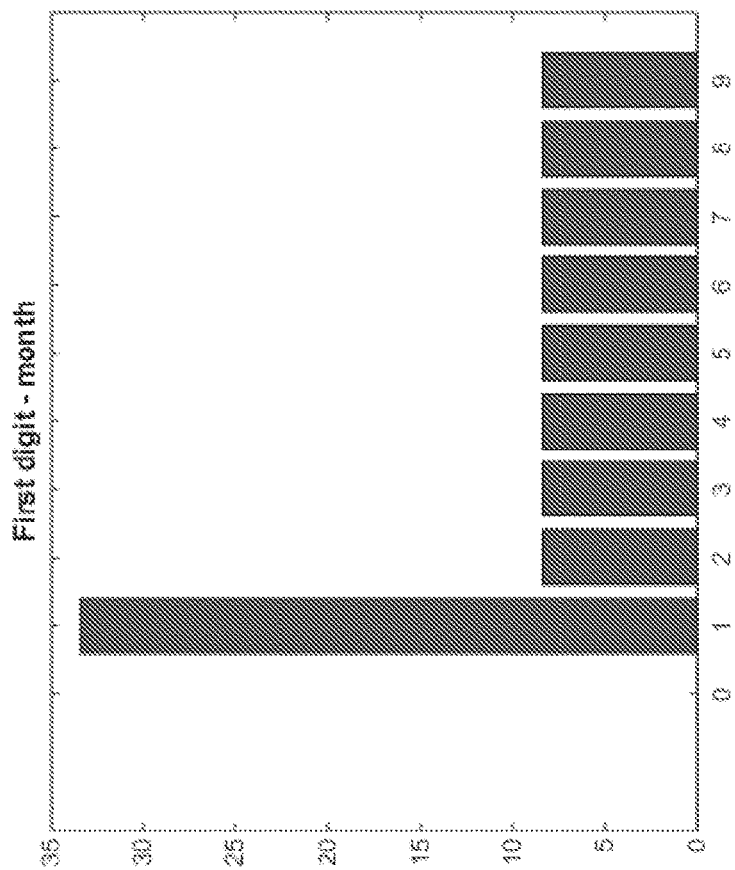

For example, certain semantic data types are expected to have limited set of possible first digits. FIG. 3 shows a probability distribution function (PDF) of first digits for the "month" data type. Here, the first digit of "1" appears in each of four different months (1/January, 10/October, 11/November, and 12/December). By contrast, the remaining possible first digits 2-9 are equally distributed (2/February, 3/March, 4/April, etc.)

Figure 4:
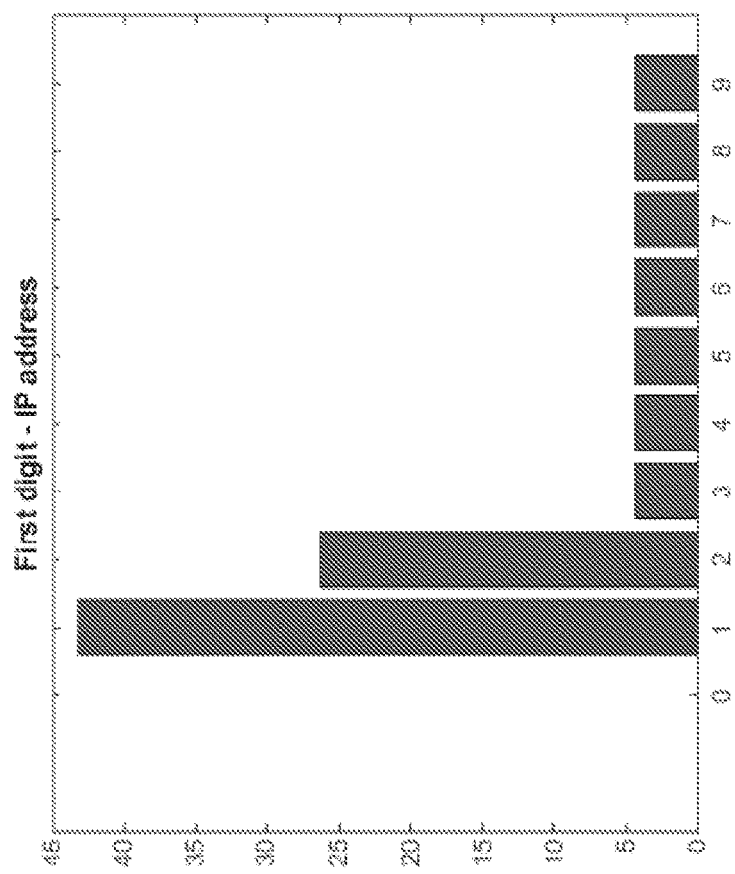
FIGS. 3-6 show probability distribution functions for different features of the "month" and "IP address" semantic data types.

Similarly, FIG. 4 shows a probability distribution function of first digits for the "IP address" data type. Here a first digit of 1 appears most frequently, followed by a first digit of 2 with lesser frequency, with remaining numbers 3-9 having an equal probability of being the first digit. This distribution of first digits within the raw data, can be recognized in order to accurately assign data type.

First digit distributions for semantic data types other than month and IP address, are known. For example, natural numbers are expected to obey Benford's law. On the other hand, some data types (e.g., IDs) may not be restricted at all in terms of their first digit.

Thus in seeking to differentiate between appropriate semantic data types for received data, examination of the first digit distribution can be informative. Agreement in first digit distribution between observed values and a reference, can indicate a match with a particular semantic data type. Similarly, lack of agreement in first digit distribution between observed values and a reference can also provide insight into data type.

A third feature of the first step of a procedure for data type enrichment, is matching a distribution of length (number of digits) between observed data and a comprehensive reference sample. This third feature quantifies agreement between observed values and expected distributions, in terms of the length (number of digits).

Specifically, data of the same semantic data type often (but not always) have the same number of digits. Examples can include but are not limited to IDs, dates, boolean values, year values, etc.

Figure 6:
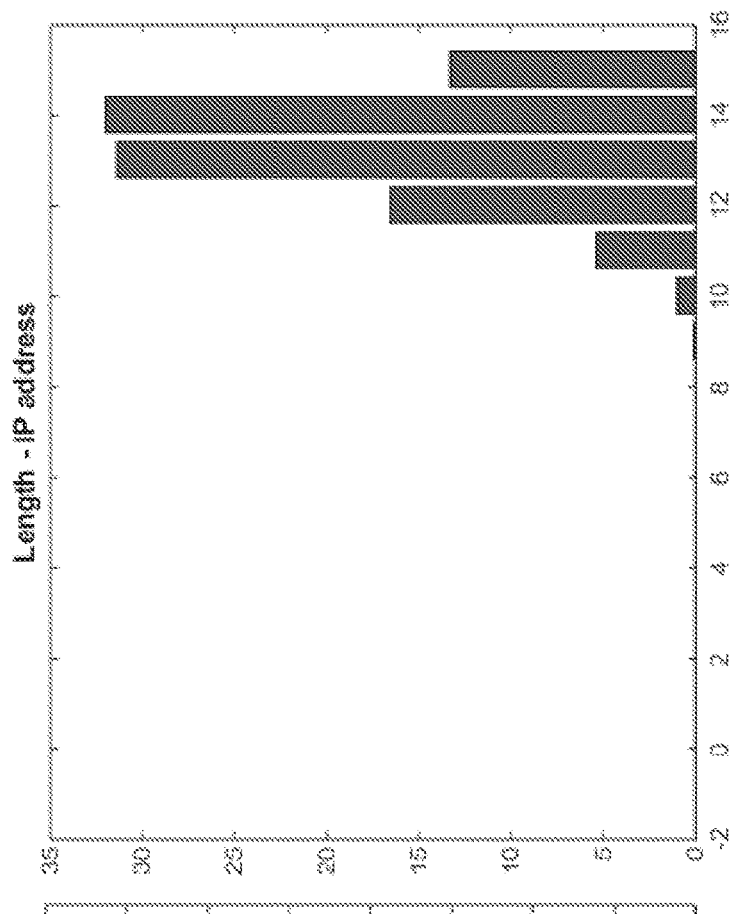
Figure 5:
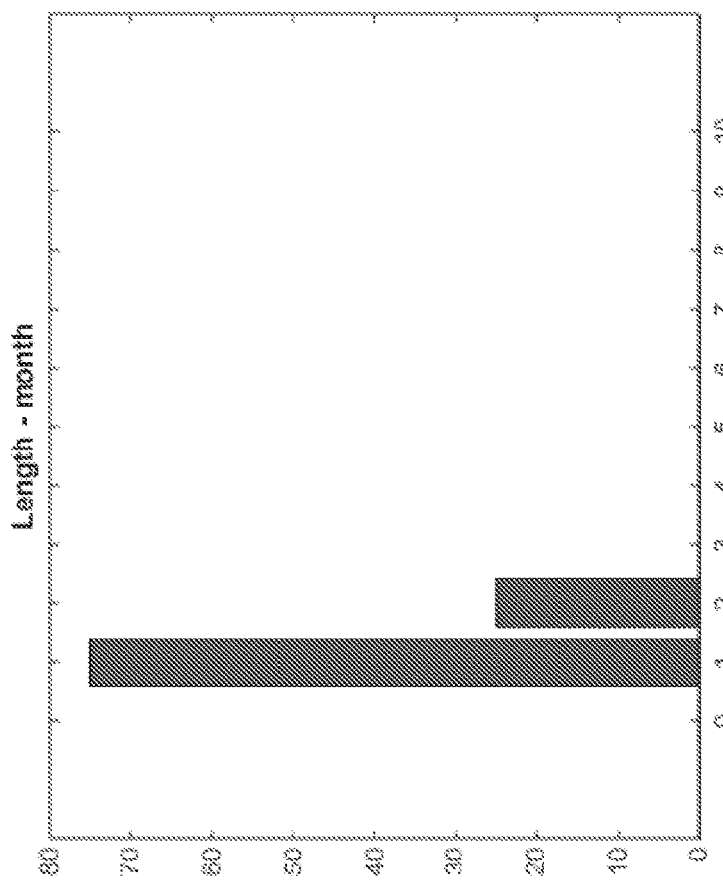

FIG. 5 shows a reference probability distribution function of length for a month data type. Only two lengths are possible: 1 (e.g., 1/January, 2/February, etc.), or 2 (10/October, 11/November, and 12/December). Similarly, FIG. 6 shows a probability distribution function of length for IP addresses, which are clustered between 9 and 15.

Such length correlation is not universal within semantic data types (e.g., numbers, IP addresses, etc). Moreover, an expected number of digits is also different among different semantic data types (e.g., year values typically have 4 digits, whereas IP addresses generally have 13-14 digits). Accordingly, the length distribution feature is also useful to infer semantic data type.

The three features discussed above, are quantified to assign semantic data type. The first feature—conversion success rate—is a fraction. Hence, that first feature is quantified as a number between 0 and 1.

The second (first digit) feature and third (length) feature, represent alignment between observed distributions a reference distribution. Such value distribution alignment may be quantified using the Kolmogorov-Smirnov (hereafter "KS") test.

The KS test yields a distance between the empirical cumulative distribution function (CDF) of the observed data, and the reference cumulative distribution function. These cumulative distribution functions are generated by integrating the underlying probability distribution functions.

The result of applying the KS test is a KS distance (rather than an affinity value). That distance is subtracted from 1 in order to reflect how well (observed/reference) distributions are aligned. The KS distance is normalized between 0 and 1, and so is the affinity value computed by subtracting the distance from 1.

Embodiments may further refine the results of applying the first step, by weighting the different features. Here, the conversion success rate may be denoted by $f_1$, the alignment of first digit distributions may be denoted by $f_2$, and alignment of length distributions may be denoted by $f_3$.

These three features may not have the same importance for the procedure in terms of their respective contribution to estimating the correct data type. Assuming a linear combination model for these three features, the final score for a given semantic data type would be calculated as:

$$f = \alpha_1 f_1 + \alpha_2 f_2 + \alpha_3 f_3$$

where $\alpha_1$, $\alpha_2$, and $\alpha_3$ are unknown coefficients.

Embodiments may employ a supervised machine learning approach to train a system to learn these coefficients from a corpus of training data with known labels, in order to maximize performance of the procedure on the training data. According to such machine learning, when presented with a previously unseen dataset by the user, the features $f_1$, $f_2$, and $f_3$ are computed and combined using the formula above to compute the final score for each semantic data type.

The system may begin with pre-computed values of $\alpha_1$, $\alpha_2$, and $\alpha_3$. When a user overrides the decision made by the procedure, the training step can be run again in order to fine-tune the coefficients to the user's needs. The column that is manually labeled/corrected by the user then becomes part of the training data to enhance the accuracy of the feature weighting.

As described above, the observed distributions of the received data are compared with reference distributions. Those reference distributions may be compiled from a large corpus of training data sampled from the real world.

FIGS. 9 and 16 are look-up tables that are specifically referenced in the example that is discussed in detail later below. In particular FIG. 9 shows a look-up table for first digit reference probability distributions for a number of semantic data types. FIG. 16 shows a look-up table for length reference probability distributions for semantic data types.

These look-up tables were generated using a large corpus of training data. As mentioned above, when a user corrects the system, the system is re-trained with the newly labeled column included in the training dataset.

It is noted that the distributions of FIGS. 9 and 16 are probability distribution functions, rather than cumulative distribution functions, for easier interpretability. Cumulative distribution functions are computed by taking the integral of the probability distributions of FIGS. 9 and 16. These cumulative distribution functions are then used in determining the KS distances utilized in KS tests.

The first step concludes with ranking and output of the classification of semantic data type. That is, the three features described above are computed and aggregated separately for each semantic data type (since the reference distributions of each class are different).

The aggregated features of each class are then ranked. The class with the highest f value is declared as the output of the first step.

EXAMPLE

A simplified example of the first step of the procedure is now provided. Here, a data column is received with the following ten (10) values:
1999
2022
1828
2016
2012
1997
2015
2018
2019
9999

For the sake of brevity, this example considers assigning a semantic data type from only two possible candidates: ●integer, and ●year. The three features of the first step of the procedure, are now computed for each of those two semantic data types.

The first feature ($f_1$) is the conversion success rate. Here, each of the ten values are valid integer values, and are also valid year values. Accordingly for this first feature the conversion success rate is 1 for both the integer and year classes: $f_1^{int}=1$; $f_1^{year}=1$.

Figure 7:
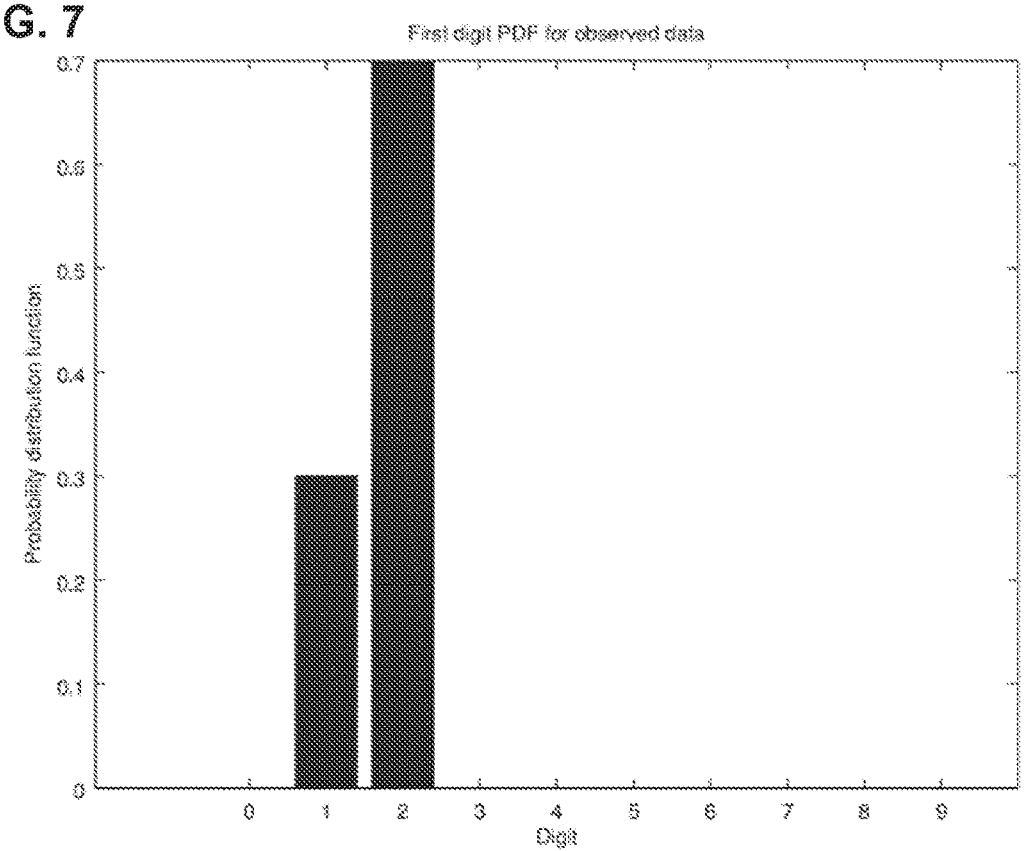

The second feature ($f_2$) of the first step examines the distribution of the first digits of the ten values. FIG. 7 is a bar chart showing the Probability Distribution Function (PDF) of first digits for the ten values. The PDF of FIG. 7 shows the first digit of each of the observed values as falling into only two categories: 1 or 2.

Figure 8:
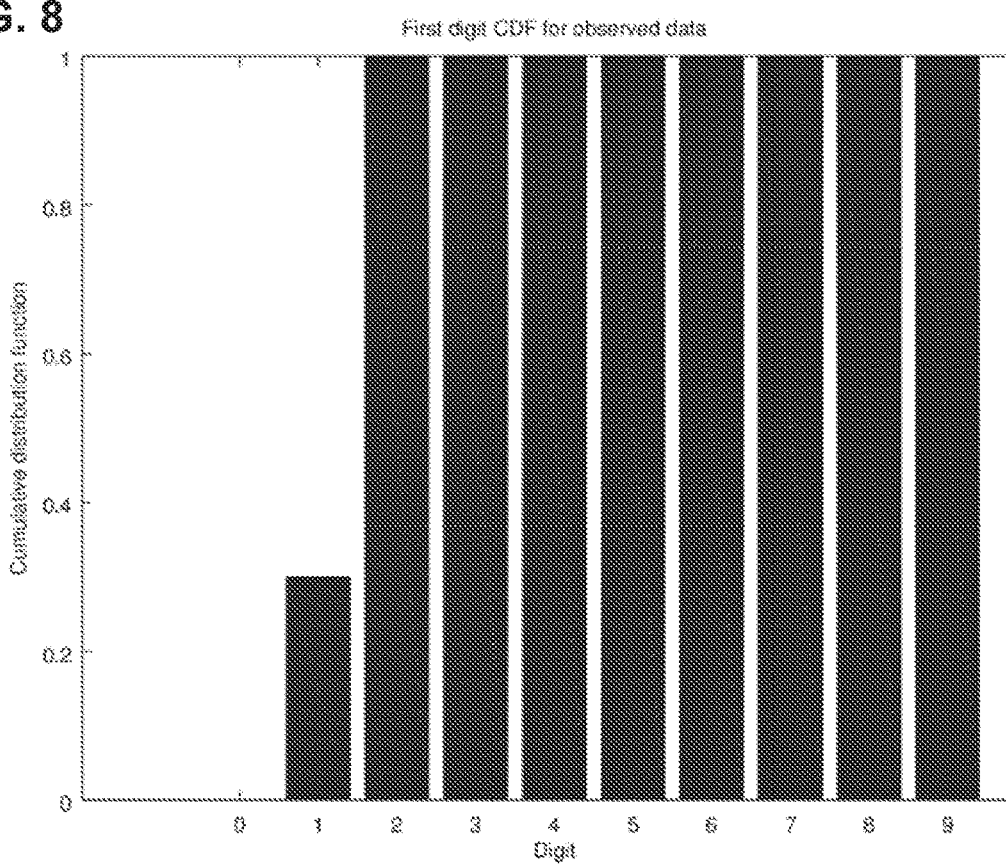

FIG. 8 is a bar chart showing the Cumulative Distribution Function (CDF) for the first digits of the ten observed values. The observed first digit CDF of FIG. 8, may be compared with reference distribution functions reflecting what would be expected from the semantic data types ●integers and ●years.

FIG. 9 is the look up table showing reference first digit distributions for a variety of different semantic data types, collected over a large corpus of training data. Here, the first row of the first digit reference table relates to ●integers, while the third row relates to ●years. The table of FIG. 9 is only one possible example, and the exact distributions shown would vary depending upon the actual collected data.

For ease of comparing observed distributions with reference distributions, the tabular reference data of FIG. 9 may also be depicted in bar chart form. Accordingly, FIG. 10 shows the reference PDF for the integer class (row 1) as a bar chart. FIG. 11 shows the reference CDF for the integer class as a bar chart.

Here, the maximum difference between first digit CDF of observed data (FIG. 8) and reference first digit CDF for integer class (FIG. 11) is 0.516, appearing at the digit 2.

The KS statistic is used as the metric to determine how well the observed CDF matches the reference CDF. The KS statistic is subtracted from 1, since we are trying to find how well the distributions match. And, the KS statistic shows distances. So for matching observed data as an ●integer for the second feature: $f_2^{int}=(1-0.516)=0.484$ (at digit 2).

Figure 12:
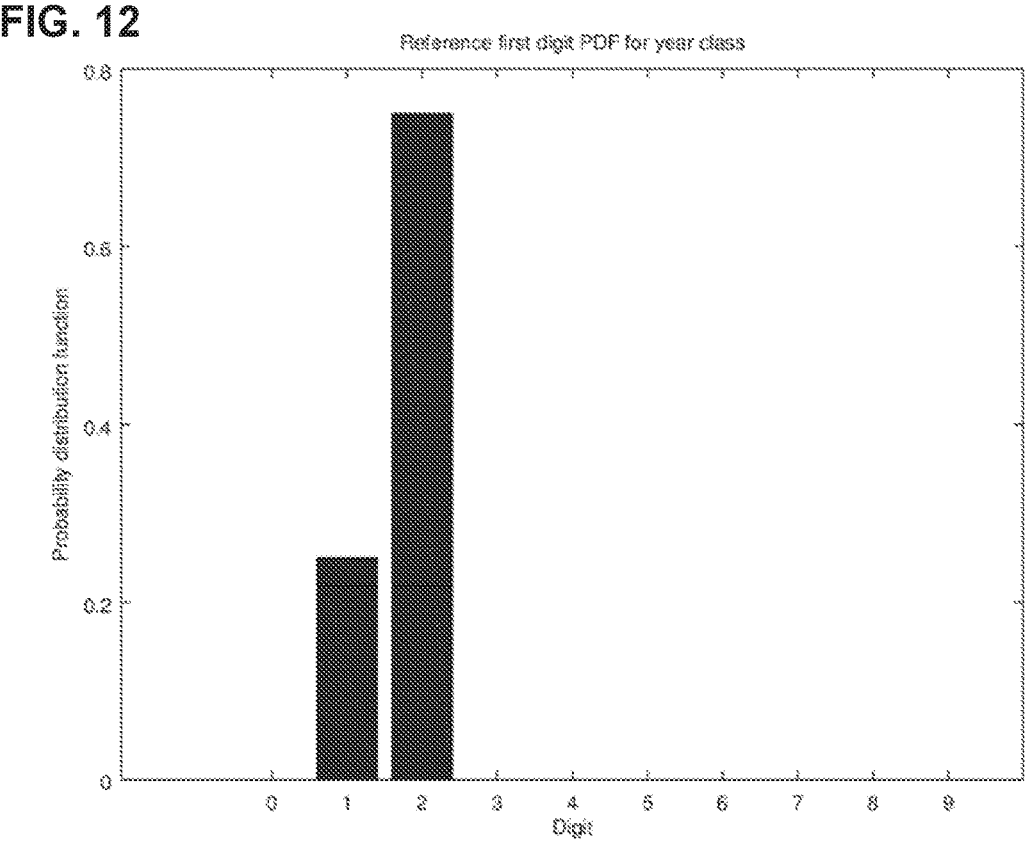
Figure 13:
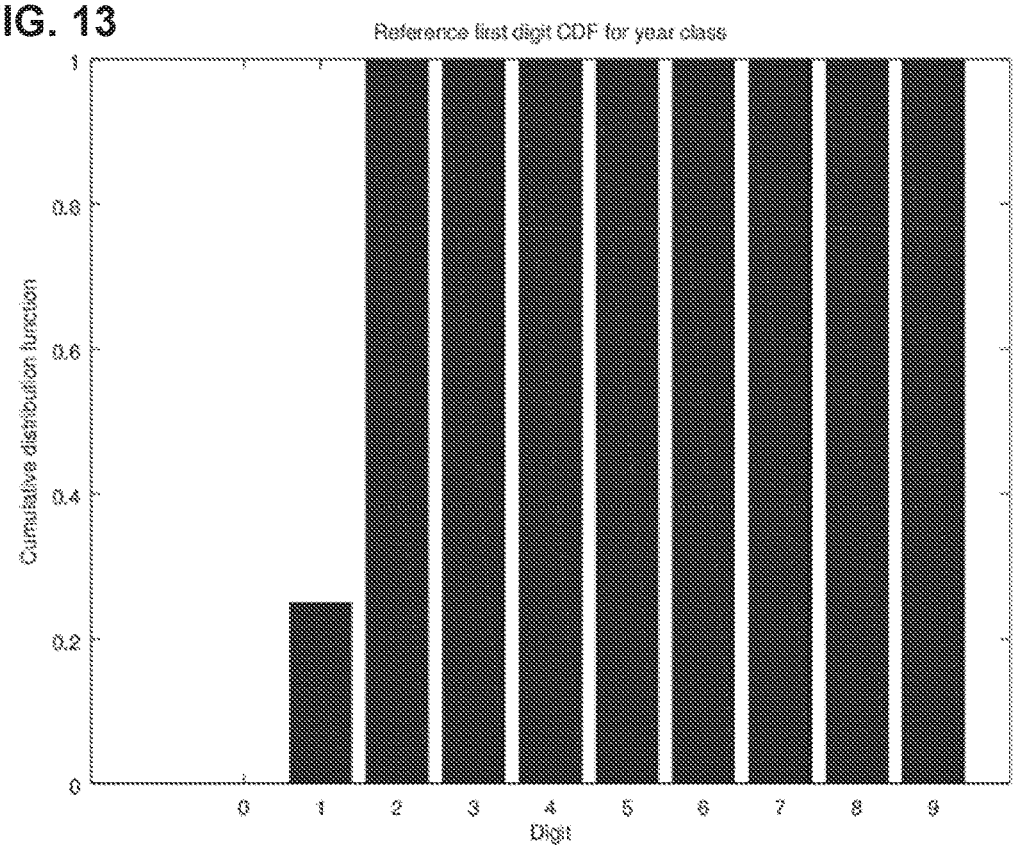

The other possible match for the observed data is the ●year semantic data type. Accordingly, FIG. 12 shows the reference PDF for the year class (row 3 in FIG. 9) as a bar chart. FIG. 13 shows the reference CDF for the year class as a bar chart.

Here, the maximum difference between first digit CDF of observed data (FIG. 8) and reference first digit CDF for integer class (FIG. 13) is 0.05, seen at the digit 1.

The KS statistic is again used the metric to determine how well the observed CDF matches the reference CDF. So for matching observed data as a ●year in the second (first digit) feature: $f_2^{year}=(1-0.05)=0.95$ (at digit 1).

Figure 14:
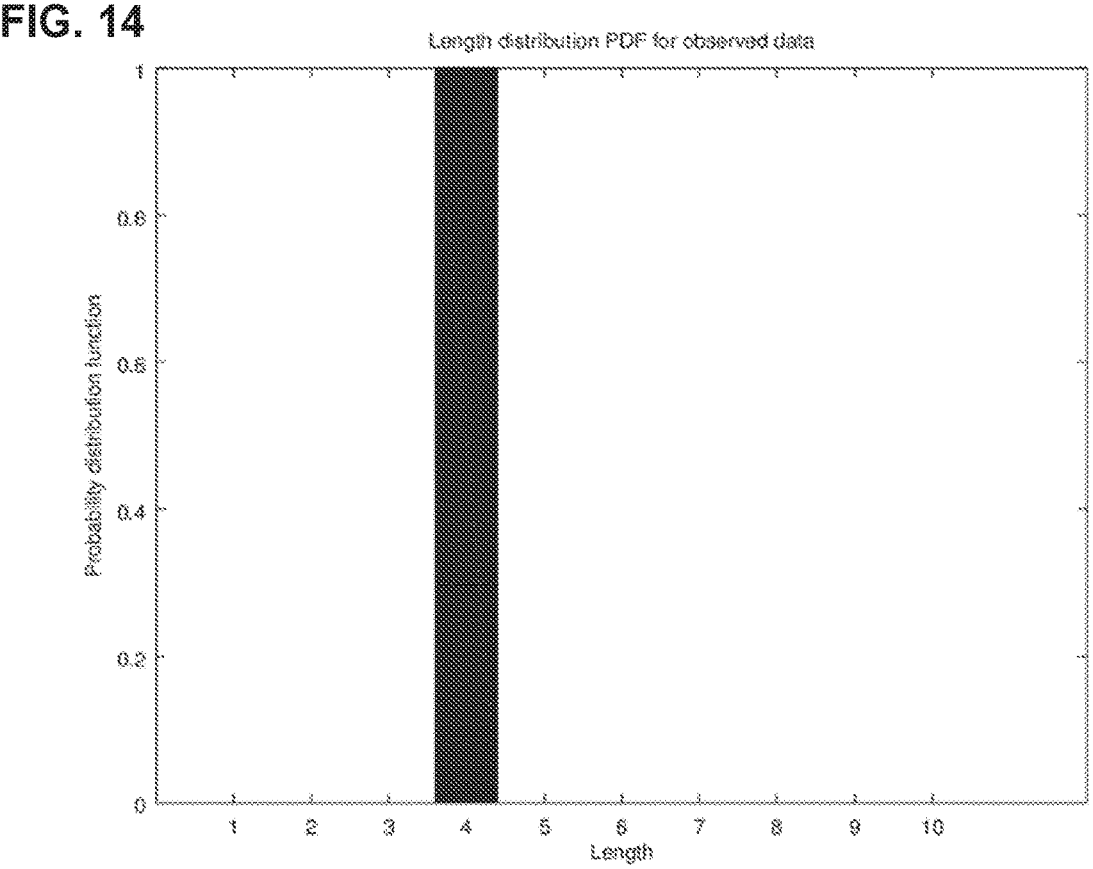

The third feature ($f_3$) of the first step is to examine the distribution of length of the ten values. FIG. 14 is a bar chart showing the PDF of length for the ten values. The PDF of FIG. 14 shows the length of each of the observed values as being exactly 4.

Figure 15:
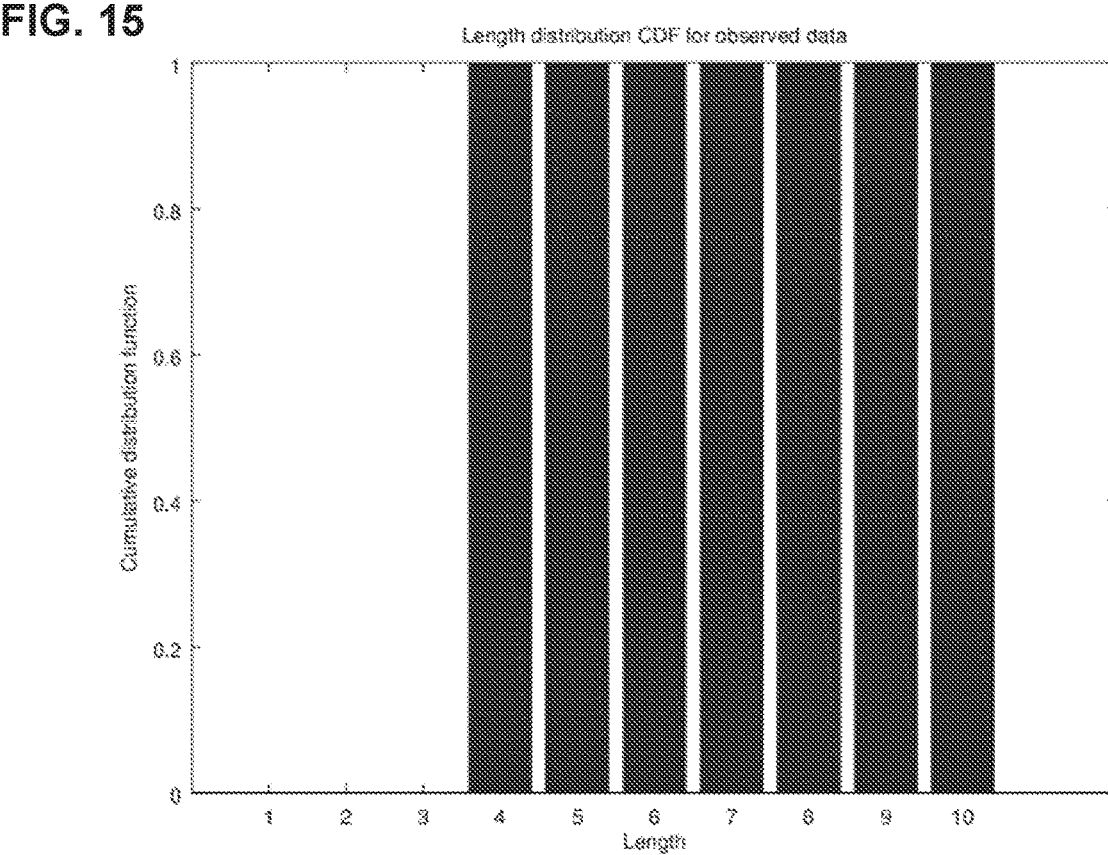

FIG. 15 is a bar chart showing the CDF of length for the ten observed values. The observed length CDF of FIG. 15, may be compared with reference distribution functions reflecting what would be expected from ●integers and ●years.

FIG. 16 is the look up table showing reference length distributions for a variety of different semantic data types, collected over a large corpus of training data. Here, the first row of the length reference table relates to ●integers, while the third row relates to ●years.

As noted by *, integer values in a column are likely to be correlated in terms of length, but it is not possible to pre-specify expected length since it can vary greatly depending on the nature of the data. As such, the expected distribution may be changed based on the observed values. Here the peak of the expected distribution (assumed to be 4 digits in this table) is moved to the mode of the observed distribution.

As noted by **, ID values are expected to have the same length across the column (i.e., they conform to a predetermined length). As with integer values, the peak of this expected distribution (assumed to be 4 digits in this table) is moved to the mode of the observed distribution.

For ease of comparing observed distributions with reference distributions, the tabular reference data of FIG. 16 may also be depicted in bar chart form. Accordingly, FIG. 17 shows the reference length PDF for the integer class (row 1) as a bar chart. FIG. 18 shows the reference length CDF for the integer class as a bar chart.

Here, the maximum difference between length CDF of observed data (FIG. 15) and reference length CDF for the integer class (FIG. 18) is 0.108 at length 3.

The KS statistic is used as the metric to determine how well the observed CDF matches the reference CDF. So for matching observed data as an ●integer for the third feature: $f_3^{int}=(1-0.108)=0.892$.

Figure 19:
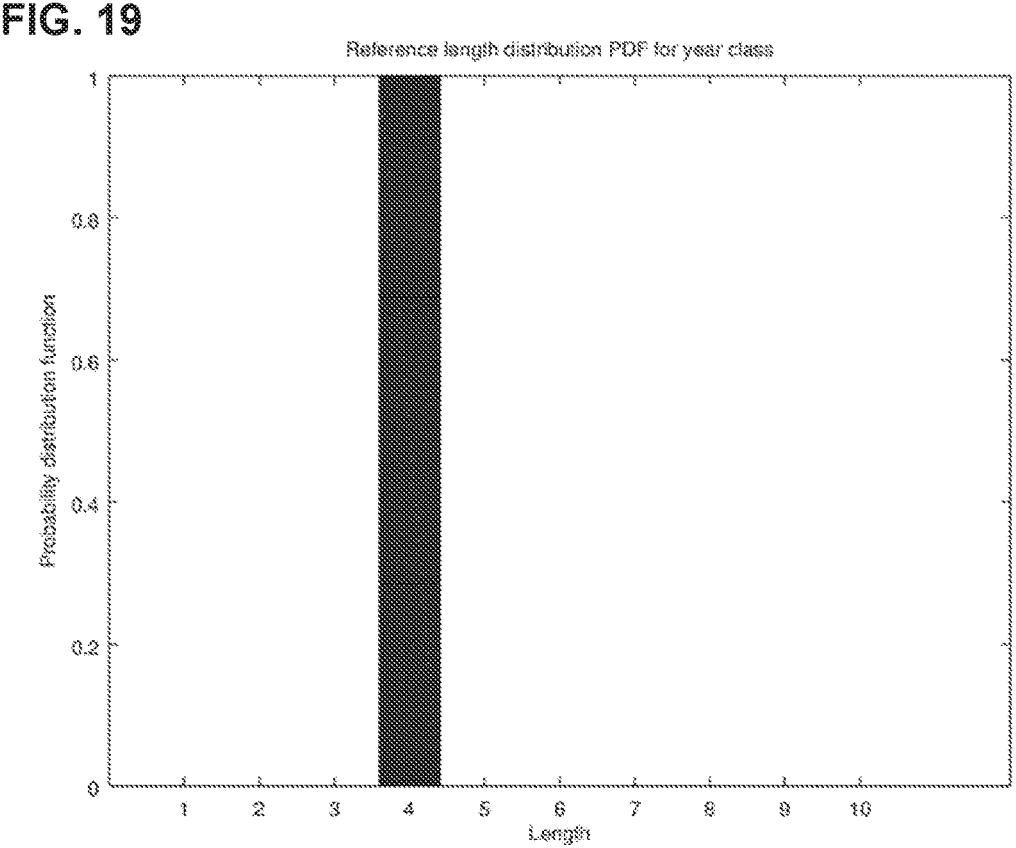
Figure 20:
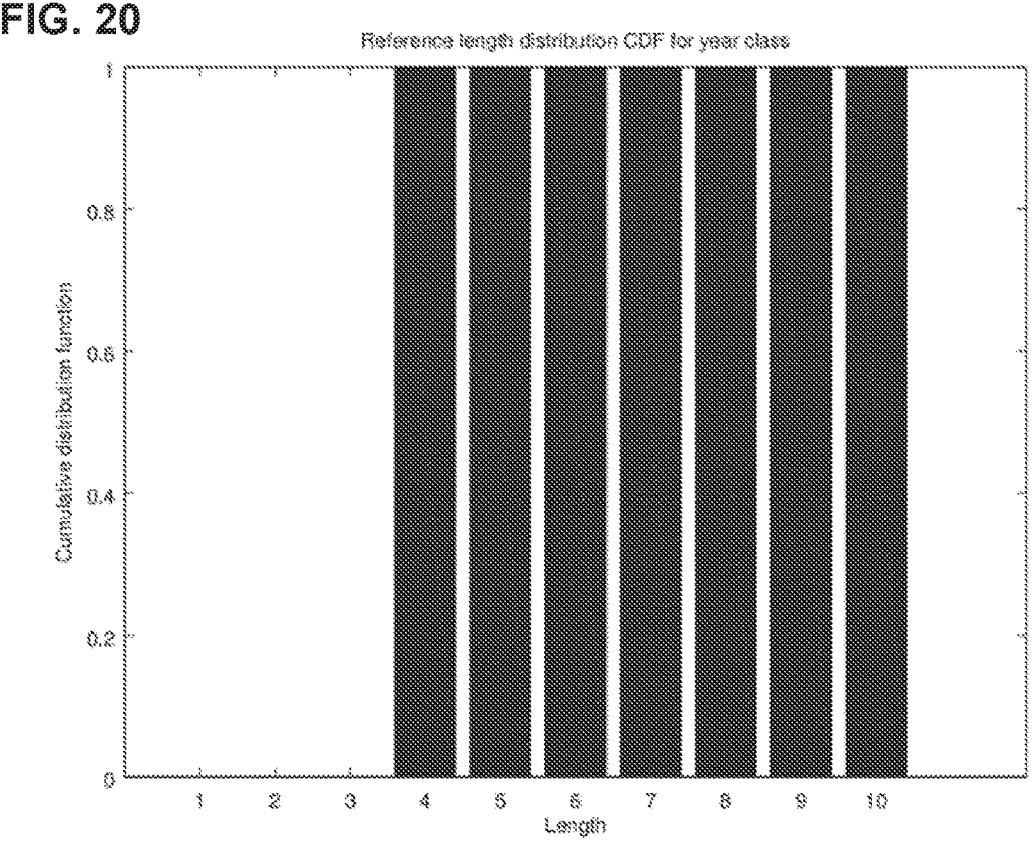

The other possible match for the observed data is the ●year semantic data type. Accordingly, FIG. 19 shows the reference PDF for the year class (row 3 in FIG. 16) as a bar chart. FIG. 20 shows the reference CDF for the year class as a bar chart.

Here, the difference between length CDF of observed data (FIG. 15) and reference length CDF for the year class (FIG. 20) is zero. The KS statistic is again used the metric to determine how well the observed CDF matches the reference CDF. So for matching observed data as a ●year in the third (length) feature: $f_3^{year}=(1-0)=1$.

The final scores for the two classes for each of the three features, are given in the table below:

|         | $f_1$ | $f_2$ | $f_3$ |
|---------|-------|-------|-------|
| Integer | 1     | 0.484 | 0.892 |
| Year    | 1     | 0.95  | 1     |

Assuming the coefficients $\alpha_1$, $\alpha_2$, and $\alpha_3$ used to weigh the features are all equal to 1 (e.g., as found in an earlier training step using supervised machine learning), final scores of each class can be found simply by adding up their individual features:

$$f^{int}=1+0.484+0.892=2.376$$

$$f^{year}=1+0.95+1=2.95$$

Here, $f^{year} > f^{int}$. Thus, the procedure would rank the semantic data type ●year, as the class for the observed set of ten data points.

It is noted that this first step in this example is considerably simplified. Typically, the procedure would be run not just for the two semantic data types of ●integer and ●year, but would be run for a large number of semantic data types for which reference distributions are available.

In some cases, performance of the first step alone may be sufficient to accurately infer data type. Certain types of input, however, can be a source of confusion.

Consider, for example, received data in the following column.
20000101
20000102
20000103
. . .
This raw data could be interpreted as IDs, or as date values without delimiters.

Accordingly, a data type enrichment procedure may employ a second step in order to differentiate between certain semantic data types. That second step is now described below.

The second step comprises adding one or more additional features that are discriminative of the semantic data types under consideration. Whether the second step is in fact needed, and the type of the test that is to be run in a second step, are dependent upon the output of the first step.

In certain embodiments, the second step is executed if the semantic data types with the top two scores for a given column are:
1) ●ID and ●8-digit date (YYYYMMDD)
2) ●ID and ●6-digit date (YYMMDD)
3) ●ID and ●year.

Assignment of semantic data type as between an ●ID an ●8-digit date, is now described. Returning to the input data column mentioned above:
20000101
20000102
20000103
. . .
These numbers could be classified as IDs or 8-digit dates with no delimiters (YYYYMMDD).

If the top two ranked classification results of the first step are ●ID and ●8-digit date, a second step with an additional feature is employed along with the three features $f_1$, $f_2$ and $f_3$ described above. This additional feature is based on distribution of the $5^{th}$ and $7^{th}$ digits.

For received data corresponding to a semantic data type of ●8-digit date, these $5^{th}$ and $7^{th}$ digits are highly restricted. Specifically, the $5^{th}$ digit corresponding to month can only be 0 or 1. The $7^{th}$ digit corresponding to day can only be 0, 1, 2, or 3.

By contrast, no corresponding restriction on the distribution of the $5^{th}$ and $7^{th}$ digits is expected for an ●ID semantic data type. Accordingly, applying the Kolmogorov-Smirnov test on distribution of $5^{th}$ and $7^{th}$ digits, a second step assesses the likelihood of data coming from an ●ID domain vs an ●8-digit date domain.

This added feature is denoted as $f_4$. It is computed by:

$$f_4=((1-KS_5)+(1-KS_7))/2,$$

where $KS_i$ is the Kolmogorov-Smirnov test statistic for the $i^{th}$ digit.

Once $f_4$ is computed, the supervised machine learning system is trained again using four features instead of three.

A second step may be employed in the data type enrichment procedure where the top two results of the first step are an ●ID and ●a 6-digit date. Consider for example the following input data column:
990101
990102
990103
. . .
These numbers could be classified as IDs or 6-digit dates with no delimiters (YYMMDD).

The second step of the data type enrichment procedure for this case is similar to that described above. Here, however the added feature comprises comparing observed/reference distributions of the $3^{rd}$ and $5^{th}$ digits. Specifically, the $3^{rd}$ digit may be restricted in terms of month, and the $5^{th}$ digit may be restricted in terms of day. Computation of Kolmogorov-Smirnov test statistics based on this feature $f_4$ added by the second step, may allow accurate assignment of data type.

A second step may also be employed in the data type enrichment procedure where the top two results of the first step are an ●ID and ●a year. Consider for example the following input data column:
2001
2002
2003
These numbers could possibly be classified as IDs or years. Here, however, only the first two digits are restricted for year values, and the first two digits may very well be the same across rows for an ID column.

Accordingly for this case embodiments examine the dispersion of the raw data, with the rationale that the values in an ID column are likely to be more dispersed as compared to a year column. This characteristic is measured by the quartile coefficient of dispersion statistic.

That quartile coefficient of dispersion statistic is computed using the raw data. It is not based on first digit or length distributions.

Similar to the other examples of the second step given above, the machine learning system may be re-trained upon the calculation of this fourth (dispersion) feature, along with the previous three features found in the first step.

While the above has described an inference-based data type enrichment procedure featuring only two steps, this is not required. Certain embodiments could employ additional steps in order to accurately assign data type to incoming data.

For example, after the first and second steps described above, a third—naming alignment—step could be performed. This third step could assess a similarity between a semantic data type identified by inference in the preceding step(s), and titles of existing columns of a data structure.

For example, if previous steps indicate a likely data structure of ●ID, this third step that information can be compared with names of existing table columns to indicate further correspondence. Thus if an existing table column is titled: "employee identifier", alignment in name between that column title and the "identifier" semantic data type, could further confirm the accuracy of the enrichment. In particular embodiments, such a comparison in naming alignment could be determined using a text relevance scoring tool, such as LUCENE, available from the Apache Software Foundation.

Systems and methods providing inference-based data type enrichment may offer one or more benefits over conventional approaches. For example, although the method detects the most likely data type for a given data column, the user may be allowed to override the inferred data type from a list of other possible data types. Those other possible data types may be presented in order of decreasing goodness-of-fit to the data.

And, based upon such user feedback, the expected data distributions and relative weights afforded to the various features may be adjusted. This provides flexibility and learning to the data type assignment approach.

It is also noted that embodiments rely upon projections of the raw data (e.g., probability distributions and cumulative distributions), rather than on the raw data itself. Such approaches respect the privacy of the user, by removing the requirement to persist the user's original data for subsequent validation processes.

It is further noted that columns of received data are individually considered in arriving at an inference of data type. Accordingly, embodiments are highly parallelizable amongst different data columns, accelerating the creation of value from big data streams.

Returning now to FIG. 1, that figure shows the inference engine as being part of an application layer that overlies a database layer. This is not required, however, and in certain embodiments the inference engine may instead be implemented by a database engine, such as an in-memory database engine. One example of an in-memory database is the HANA database system available from SAP SE, of Walldorf, Germany Other examples of in memory database can include the SYBASE IQ database also available from SAP SE, the Microsoft Embedded SQL for C (ESQL/C) database available from Microsoft Corp. of Redmond, Wash., and the Exalytics In-Memory database available from Oracle Corp. of Redwood Shores, Calif.

Such embodiments may leverage the inherent power of the existing in-memory database engine in order to accomplish certain processing tasks. For example, the in-memory database engine could perform the preliminary step of converting observed/reference PDFs into corresponding CDFs.

The in-memory database engine could also be responsible for the subsequent step of determining alignment between the observed CDFs and reference CDFs (e.g., by calculating KS distances). Still other tasks that may be effectively performed by an in-memory database engine, can include but are not limited to generating weight coefficients for individual feature scores (for calculating per-semantic data type total scores), and/or modifying training data (e.g., stored within the in-memory database) in response to user feedback.

Figure 21:
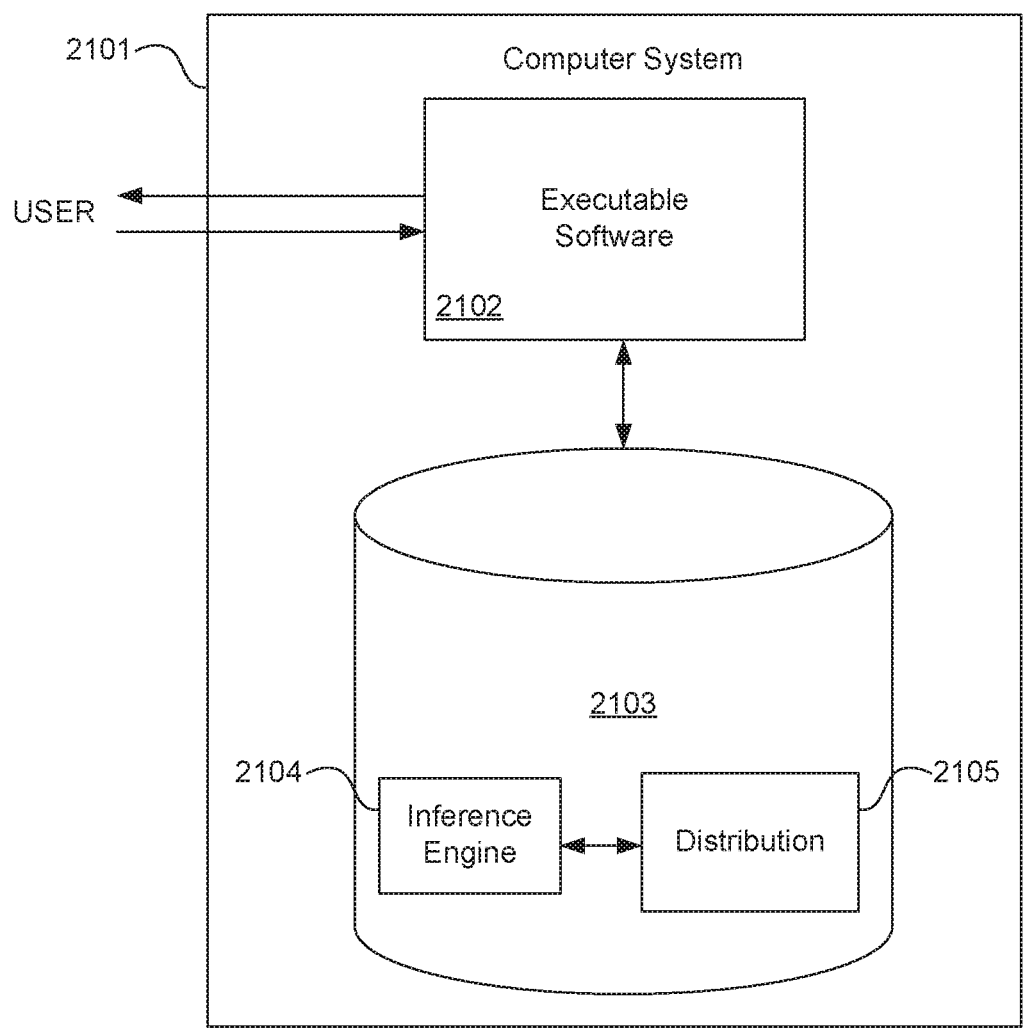
FIG. 21 illustrates hardware of a special purpose computing machine configured to perform inference of data types according to an embodiment.

FIG. 21 illustrates hardware of a special purpose computing machine configured to enrich a data set with data types according to an embodiment. In particular, computer system 2101 comprises a processor 2102 that is in electronic communication with a non-transitory computer-readable storage medium 2103. This computer-readable storage medium has stored thereon code 2105 corresponding to (observed/reference) distributions. Code 2104 corresponds to an inference engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 21, the engine is shown as being part of a database. Such an embodiment can correspond to applications performing processing by a powerful engine available as part of an in-memory database (e.g., the HANA in-memory database available from SAP SE of Walldorf, Germany) However, this not required and in certain embodiments (e.g., that shown in FIG. 1) the engine may be implemented in other ways, for example as part of an overlying application layer.

Figure 22:
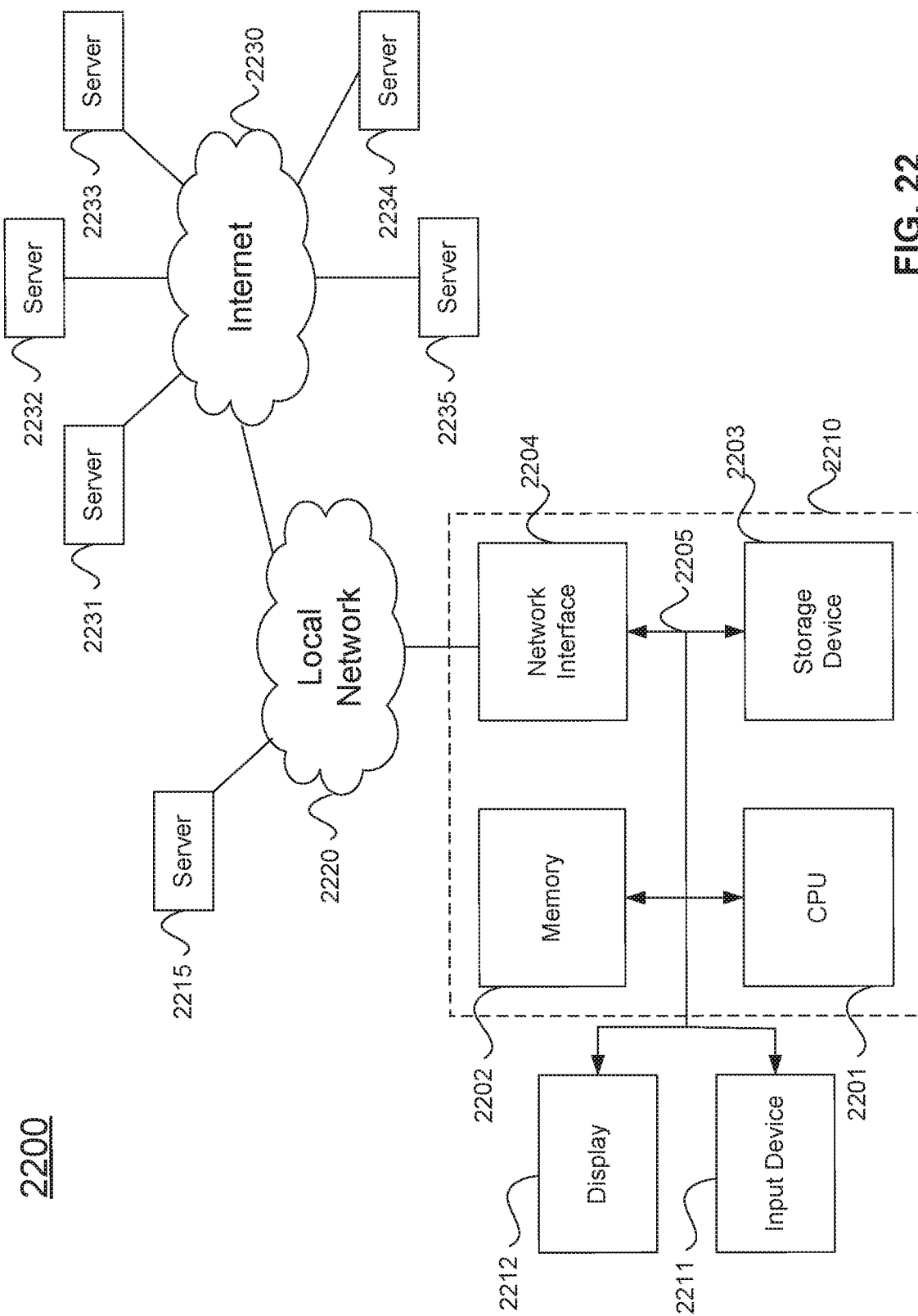
FIG. 22 illustrates an example computer system.

An example computer system 2200 is illustrated in FIG. 22. Computer system 2210 includes a bus 2205 or other communication mechanism for communicating information, and a processor 2201 coupled with bus 2205 for processing information. Computer system 2210 also includes a memory 2202 coupled to bus 2205 for storing information and instructions to be executed by processor 2201, including information and instructions for performing the techniques described above, for example. This memory may also be used for storing variables or other intermediate information during execution of instructions to be executed by processor 2201. Possible implementations of this memory may be, but are not limited to, random access memory (RAM), read only memory (ROM), or both. A storage device 2203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2203 may include source code, binary code, or software files for performing the techniques above, for example. Storage device and memory are both examples of computer readable mediums.

Computer system 2210 may be coupled via bus 2205 to a display 2212, such as a cathode ray tube (CRT) or liquid crystal display (LCD), for displaying information to a computer user. An input device 2211 such as a keyboard and/or mouse is coupled to bus 2205 for communicating information and command selections from the user to processor 2201. The combination of these components allows the user to communicate with the system. In some systems, bus 2205 may be divided into multiple specialized buses.

Computer system 2210 also includes a network interface 2204 coupled with bus 2205. Network interface 2204 may provide two-way data communication between computer system 2210 and the local network 2220. The network interface 2204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2204 sends and receives electrical, electromagnetic, or optical signals that carry digital data streams representing various types of information.

Computer system 2210 can send and receive information, including messages or other interface actions, through the network interface 2204 across a local network 2220, an Intranet, or the Internet 2230. For a local network, computer system 2210 may communicate with a plurality of other computer machines, such as server 2215. Accordingly, computer system 2210 and server computer systems represented by server 2215 may form a cloud computing network, which may be programmed with processes described herein. In the Internet example, software components or services may reside on multiple different computer systems 2210 or servers 2231-2235 across the network. The processes described above may be implemented on one or more servers, for example. A server 2231 may transmit actions or messages from one component, through Internet 2230, local network 2220, and network interface 2204 to a component on computer system 2210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    receiving a plurality of data points lacking associated metadata;
    determining a first score of a first feature comprising a success rate converting the plurality of data points to a semantic data type;
    determining a second score from alignment between an observed distribution of a second feature in the plurality of data points, and a reference distribution of the second feature in the semantic data type;
    calculating a total score for the semantic data type from the first and second scores;
    determining an initial ranking of the total score in comparison with another total score reflecting the first and second features in another semantic data type;
    identifying a third feature differentiating between the semantic data type and the other semantic data type;
    assigning a final ranking to the total score and the other total score by,
        determining alignment between an observed distribution of the third feature in the plurality of data points, and reference distributions of the third feature in the semantic data type and in the other semantic data type;
    assigning the semantic data type to the plurality of data points based upon the final ranking; and
    storing the plurality of data points with metadata indicating the semantic data type.

2. A method as in claim 1 wherein the second feature comprises one of:
    a data point length; and
    a data point first digit.

3. A method as in claim 2 further comprising:
    determining a third score from alignment between an observed distribution of a fourth feature in the plurality of data points, and a reference distribution of the fourth feature in the semantic data type,
    wherein the total score is further calculated from the third score.

4. A method as in claim 3 wherein the fourth feature comprises the other of:
    a data point length; and
    a data point first digit.

5. A method as in claim 1 wherein:
    the alignment between the observed distribution of the second feature and the reference distribution of the second feature is reflected by a Kolmogorov-Smirnov distance.

6. A method as in claim 1 wherein the third feature comprises a number of digits behind a decimal point.

7. A method as in claim 1 wherein the third feature comprises a data point digit other than a first digit.

8. A method as in claim 1 further comprising:
    deriving the reference distribution of the second feature from training data;
    receiving feedback regarding accuracy of the assignment of semantic data type; and
    updating the training data to reflect the feedback.

9. A method as in claim 1 further comprising:
    receiving feedback regarding accuracy of the assignment of semantic data type;
    calculating the total score by assigning respective weight coefficients to the first and second scores; and
    updating the respective weight coefficients based upon the feedback.

10. A non-transitory computer readable storage medium embodying a computer program for performing a method, said method comprising:
    receiving a plurality of data points lacking associated metadata;
    determining a first score of a first feature comprising a success rate converting the plurality of data points to a semantic data type;
    determining a second score from alignment between an observed distribution of a second feature in the plurality of data points, and a reference distribution of the second feature in the semantic data type;
    calculating a total score for the semantic data type from the first and second scores;
    determining an initial ranking of the total score in comparison with another total score reflecting the first and second features in another semantic data type;
    identifying a third feature differentiating between the semantic data type and the other semantic data type;
    assigning a final ranking to the total score and the other total score by,
        determining alignment between an observed distribution of the third feature in the plurality of data points, and reference distributions of the third feature in the semantic data type and in the other semantic data type;
    assigning the semantic data type to the plurality of data points based upon the final ranking; and
    storing the plurality of data points with metadata indicating the semantic data type.

11. A non-transitory computer readable storage medium as in claim 10 wherein the semantic data type comprises an integer, a date, a month, a day, an identifier, an IP address, a currency transaction, or a currency balance.

12. A non-transitory computer readable storage medium as in claim 10 wherein the second feature comprises a data point length, a data point first digit, other than a first digit of a data point, a dispersion, a number of digits after a decimal point.

13. A non-transitory computer readable storage medium as in claim 10 wherein the method further comprises:
deriving the reference distribution of the second feature from training data;
receiving feedback regarding accuracy of the assignment of semantic data type; and
updating the training data to reflect the feedback.

14. A non-transitory computer readable storage medium as in claim 10 wherein the method further comprises:
receiving feedback regarding accuracy of the assignment of semantic data type;
calculating the total score by assigning respective weight coefficients to the first and second scores; and
updating the respective weight coefficients based upon the feedback.

15. A non-transitory computer readable storage medium as in claim 10 wherein converting the plurality of data points to the semantic data type employs a pattern matching mechanism.

16. A computer system comprising:
one or more processors;
a software program, executable on said computer system, the software program configured to cause an in-memory database engine to:
receive a plurality of data points lacking associated metadata;
determine a first score of a first feature comprising a success rate converting the plurality of data points to a semantic data type;
determine a second score from alignment between an observed distribution of a second feature in the plurality of data points, and a reference distribution of the second feature in the semantic data type;
calculate a total score for the semantic data type from the first and second scores;
determine an initial ranking of the total score in comparison with another total score reflecting the first and second features in another semantic data type;
identify a third feature differentiating between the semantic data type and the other semantic data type;
assign a final ranking to the total score and the other total score by,
determining alignment between an observed distribution of the third feature in the plurality of data points, and reference distributions of the third feature in the semantic data type and in the other semantic data type;
assign the semantic data type to the plurality of data points based upon the final ranking; and
store the plurality of data points in a column of a table of an in-memory database with metadata indicating the semantic data type.

17. A computer system as in claim 16 wherein the software is further configured to cause the in-memory database engine to:
calculate the alignment between the observed distribution of the second feature and the reference distribution of the second feature as a Kolmogorov-Smirnov distance.

18. A computer system as in claim 16 wherein the software is further configured to cause the in-memory database engine to:
receive feedback regarding accuracy of the assignment of semantic data type;
calculate the total score by assigning respective weight coefficients to the first and second scores; and
update the respective weight coefficients based upon the feedback.

19. A computer system as in claim 16 wherein the software is further configured to cause the in-memory database engine to:
derive the reference distribution of the second feature from training data stored in the in-memory database;
receive feedback regarding accuracy of the assignment of semantic data type; and
update the training data to reflect the feedback.

20. A computer system as in claim 16 wherein the software is further configured to cause the in-memory database engine to convert the plurality of data points to the semantic data type by pattern matching.

* * * * *